US012313012B2

(12) United States Patent
McCambridge et al.

(10) Patent No.: US 12,313,012 B2
(45) Date of Patent: May 27, 2025

(54) SYSTEM AND METHOD FOR REDUCING A CLEARANCE GAP IN AN ENGINE

(71) Applicant: General Electric Company, Schenectady, NY (US)

(72) Inventors: Michael Scott McCambridge, Loveland, OH (US); Logan Daniel Fritz, West Chester, OH (US); David Marion Ostdiek, Liberty Township, OH (US); Timothy M. Kasberg, Liberty Township, OH (US); Jason Holden, Wyoming, OH (US); Syed J. Khalid, Palm Beach Gardens, FL (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 18/449,053

(22) Filed: Aug. 14, 2023

(65) Prior Publication Data

US 2025/0059921 A1 Feb. 20, 2025

(51) Int. Cl.
*F02C 9/20* (2006.01)
*B64D 31/00* (2024.01)
*F01D 7/00* (2006.01)
*F01D 11/20* (2006.01)

(52) U.S. Cl.
CPC ............... *F02C 9/20* (2013.01); *B64D 31/00* (2013.01); *F01D 11/20* (2013.01); *F01D 7/00* (2013.01)

(58) Field of Classification Search
CPC ... F02C 9/20; F01D 11/20; F01D 7/00; B64D 31/00
See application file for complete search history.

(56) References Cited

U.S. PATENT DOCUMENTS

| | | | |
|---|---|---|---|
| 4,278,398 A | 7/1981 | Hull | |
| 5,205,712 A * | 4/1993 | Hamilton | F04D 29/323 416/162 |
| 6,155,038 A | 12/2000 | Irwin et al. | |
| 6,758,044 B2 | 7/2004 | Mannarino | |
| 9,752,450 B2 | 9/2017 | Duguay et al. | |

(Continued)

FOREIGN PATENT DOCUMENTS

CN 113250759 A 8/2021
FR 2601074 A1 1/1988

*Primary Examiner* — Woody A Lee, Jr.
*Assistant Examiner* — Eric A Lange
(74) *Attorney, Agent, or Firm* — Smith Gambrell & Russell

(57) ABSTRACT

A method for reducing a clearance gap between a plurality of rotor blades and a shroud assembly of an engine includes determining, with a flight control system, that an airplane is in a first flight condition. The method also includes adjusting the clearance gap to a first clearance gap distance associated with the first flight condition. Further, the method includes receiving, with the flight control system, a demand for a second flight condition. During the second flight condition, the method includes adjusting at least two independently controllable parameters, the at least two independently controllable parameters comprising, at least, a first parameter for optimizing the clearance gap and a second parameter for satisfying a thrust demand of the engine, the first parameter having a first impact on the clearance gap, the second parameter having a second impact on the clearance gap, the first impact being greater than the second impact.

19 Claims, 7 Drawing Sheets

(56) References Cited

U.S. PATENT DOCUMENTS

| | | |
|---|---|---|
| 11,473,510 B2 | 10/2022 | Kehoe et al. |
| 2016/0311546 A1* | 10/2016 | Adibhatla .............. B64D 31/06 |
| 2017/0218975 A1* | 8/2017 | Bintz ........................ F02K 1/09 |
| 2020/0088108 A1* | 3/2020 | Klein ........................ F02K 3/06 |
| 2020/0141331 A1 | 5/2020 | Tramontin |

* cited by examiner

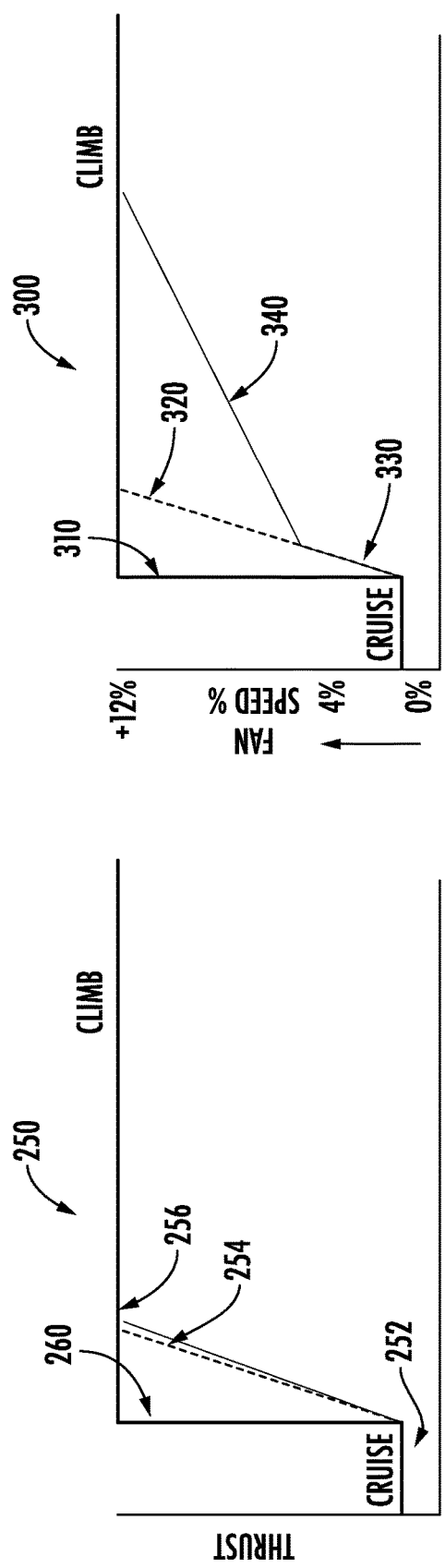
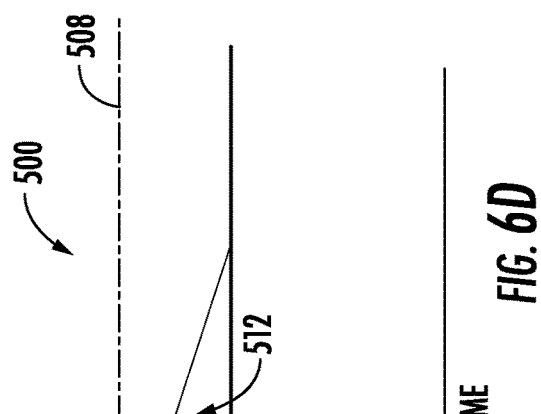
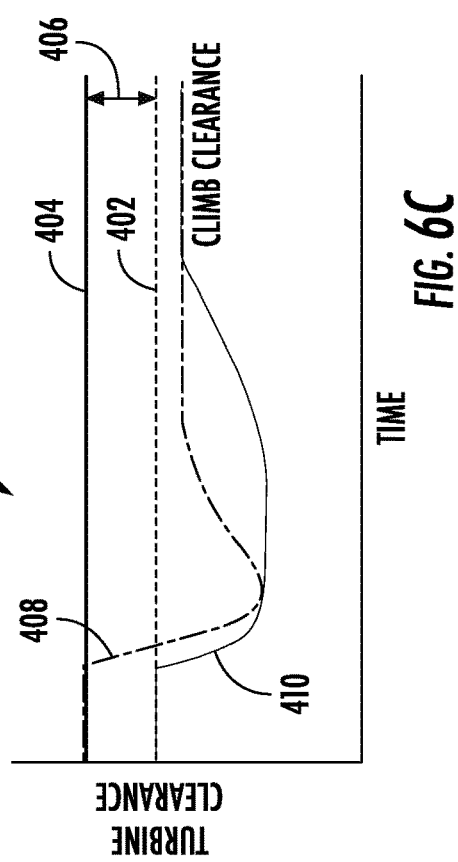
FIG. 6A
FIG. 6B
FIG. 6C
FIG. 6D

SYSTEM AND METHOD FOR REDUCING A CLEARANCE GAP IN AN ENGINE

FIELD

The present disclosure relates generally to aircraft engines and, more specifically, to controlling a clearance gap within an aircraft engine to facilitate more efficient operation of the aircraft engine during operations.

BACKGROUND

At least some known aircraft include an engine control system, sometimes referred to as a full authority digital engine control (FADEC). The FADEC is a system that includes a digital computer and its related accessories that control all aspects of aircraft engine performance. The FADEC receives multiple current input variables of the current flight condition including, for example, but not limited to, air density, throttle lever position, engine temperatures, engine pressures, and current values of other engine parameters. The inputs are received and analyzed many times per second. Engine operating parameters such as fuel flow, stator vane position, bleed valve position, and others are computed from this data and applied as appropriate to provide optimum engine efficiency for a given current flight condition.

The aircraft also typically include a flight control system, which may include a system typically referred to as a flight management system (FMS). The FMS is a specialized computer system that automates a wide variety of in-flight tasks, including the in-flight management of the flight plan. Using various sensors, such as, but not limited to, global positioning system (GPS), inertial navigation system (INS), and backed up by radio navigation to determine the aircraft's position, the FMS guides the aircraft along the flight plan. From the cockpit, the FMS is normally controlled through a Control Display Unit (CDU) which incorporates a small screen and keyboard or touch screen. The FMS transmits the flight plan for display on the EFIS, Navigation Display (ND) or Multifunction Display (MFD). The FADEC and FMS are separate system that in some cases may communicate current values of parameters.

Some known aircraft engines include both hot section and cold section modules including both compressors and turbines. To improve fuel efficiency, thrust, and/or turbine life, at least some known engines attempt to control a distance or clearance between a tip of each turbine or compressor blade and a surrounding stator. However, a blade tip length, as measured from a rotor center, may increase due to both increases in rotational speed and operating temperatures. Both of such effects may be caused by increasing fuel flow during maneuvers such as climbs, certain acts in the descent/landing sequence, and/or evasive actions. Moreover, the blade tip length may increase more rapidly than the shroud or stator expands during operation, especially during transient operations, such as those that require increased fuel flow. As such, during such operations, the blade tip may come into contact with the shroud in a condition known as a rub.

At least some known aircraft engines use active clearance control to prevent rubs while minimizing operating clearances throughout all operating conditions. Active clearance control, in at least some conventional systems, attempts to cause the shroud or stator to expand or contract by changing the thermal environment of the hardware. However, these systems are dependent on the hardware time constants and have transient lag typically much slower than the mechanical growth of the hardware due to changes in speed.

Further, at least some known aircraft engines activate a clearance control in response to one or more engine operating parameters. Moreover, at least some known aircraft engines activate a clearance control based on an elapsed time relative to a transient engine condition, such as a throttle maneuver and/or a change in rotor speed. In addition, at least some known aircraft engines modulate a clearance control based on, for example, an aircraft altitude. Still other known active clearance controls are based on mathematical models based on data acquired from one or more aircraft engines.

However, such controls may not adequately anticipate an increase in fuel flow in order to mitigate blade tip rub due to excessively tight clearance. For example, during flights in which a throttle change is required to climb from one altitude to another, aircraft engine response is conventionally increased based on a predetermined schedule, causing the rotor blades to grow (e.g., lengthen) more rapidly than the shroud surrounding them, due to mechanical acceleration of the rotor blades. Clearance control systems lag behind the relatively rapid expansion of the blades when engine speed is increased. As such, improved control strategies are desired in the art to prevent rub.

BRIEF DESCRIPTION OF THE DRAWINGS

A full and enabling disclosure, including the best mode thereof, directed to one of ordinary skill in the art, is set forth in the specification, which refers to the appended Figures, in which:

FIG. 6A is a chart illustrating a comparison of the current thrust response of an aircraft engine and the thrust response of an aircraft engine using the clearance control system according to an embodiment of the present disclosure.

FIG. 6B is a chart illustrating a comparison of the current fan speed response of an aircraft engine and the fan speed of an aircraft engine using the clearance control system according to an embodiment of the present disclosure.

FIG. 6C is a chart illustrating a comparison of the turbine clearance response of an aircraft engine and the turbine clearance of an aircraft engine using the clearance control system according to an embodiment of the present disclosure.

FIG. 6D is a chart illustrating a comparison of the current fan pitch response of an aircraft engine compared to the fan pitch of an engine using the clearance control system according to embodiment of the present disclosure.

Figure 1:
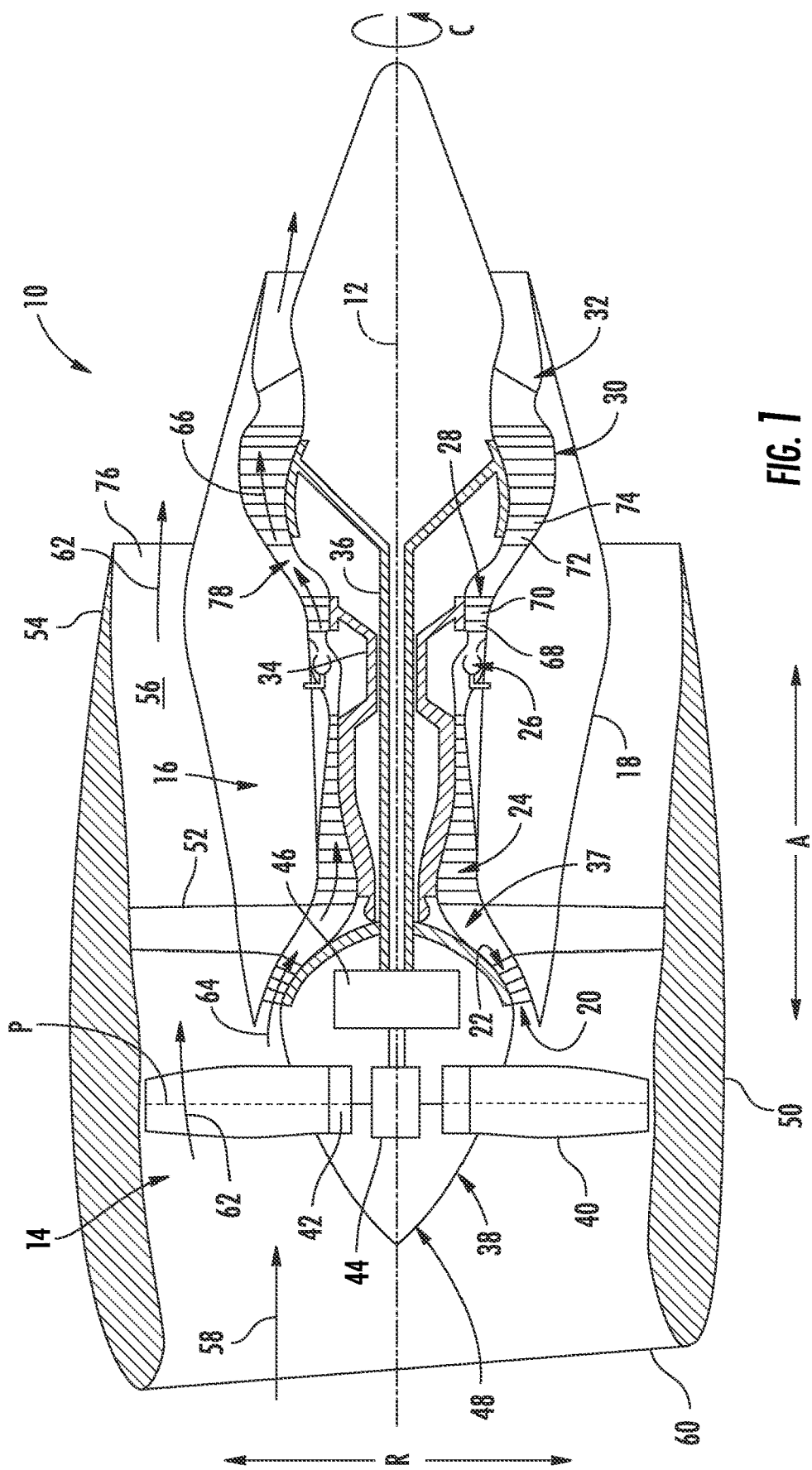
FIG. 1 is a cross-sectional view of a gas turbine engine in accordance with an exemplary aspect of the present disclosure.

Repeat use of reference characters in the present specification and drawings is intended to represent the same or analogous features or elements of the present disclosure.

DETAILED DESCRIPTION

Reference now will be made in detail to embodiments of the disclosure, one or more examples of which are illustrated in the drawings. Each example is provided by way of explanation of the disclosure, not limitation of the disclosure. In fact, it will be apparent to those skilled in the art that various modifications and variations can be made in the present disclosure without departing from the scope or spirit of the disclosure. For instance, features illustrated or described as part of one embodiment can be used with another embodiment to yield a still further embodiment. Thus, it is intended that the present disclosure covers such modifications and variations as come within the scope of the appended claims and their equivalents.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The singular forms "a", "an", and "the" include plural references unless the context clearly dictates otherwise.

The term "at least one of" in the context of, e.g., "at least one of A, B, or C" refers to only A, only B, only C, or any combination of A, B, and C.

The term "turbomachine" refers to a machine including one or more compressors, a heat generating section (e.g., a combustion section), and one or more turbines that together generate a torque output.

The term "gas turbine engine" refers to an engine having a turbomachine as all or a portion of its power source. Example gas turbine engines include turbofan engines, turboprop engines, turbojet engines, turboshaft engines, etc., as well as hybrid-electric versions of one or more of these engines.

The term "combustion section" refers to any heat addition system for a turbomachine. For example, the term combustion section may refer to a section including one or more of a deflagrative combustion assembly, a rotating detonation combustion assembly, a pulse detonation combustion assembly, or other appropriate heat addition assembly. In certain example embodiments, the combustion section may include an annular combustor, a can combustor, a cannular combustor, a trapped vortex combustor (TVC), or other appropriate combustion system, or combinations thereof.

As used herein, the term "rotor" refers to any component of a rotary machine, such as a turbine engine, that rotates about an axis of rotation. By way of example, a rotor may include a shaft or a spool of a rotary machine, such as a turbine engine.

As used herein, the term "stator" refers to any component of a rotary machine, such as a turbine engine, that has a coaxial configuration and arrangement with a rotor of the rotary machine. A stator may be disposed radially inward or radially outward along a radial axis in relation to at least a portion of a rotor. Additionally, or in the alternative, a stator may be disposed axially adjacent to at least a portion of a rotor.

The terms "low" and "high", or their respective comparative degrees (e.g., -er, where applicable), when used with a compressor, a turbine, a shaft, or spool components, etc. each refer to relative speeds within an engine unless otherwise specified. For example, a "low turbine" or "low speed turbine" defines a component configured to operate at a rotational speed, such as a maximum allowable rotational speed, lower than a "high turbine" or "high speed turbine" of the engine.

The terms "forward" and "aft" refer to relative positions within a gas turbine engine or vehicle and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

As used herein, the terms "axial" and "axially" refer to directions and orientations that extend substantially parallel to a centerline of the gas turbine engine. Moreover, the terms "radial" and "radially" refer to directions and orientations that extend substantially perpendicular to the centerline of the gas turbine engine. In addition, as used herein, the terms "circumferential" and "circumferentially" refer to directions and orientations that extend arcuately about the centerline of the gas turbine engine.

The terms "coupled", "fixed", "attached to", and the like refer to both direct coupling, fixing, or attaching, as well as indirect coupling, fixing, or attaching through one or more intermediate components or features, unless otherwise specified herein.

As used herein, the terms "first", "second", "third" and so on may be used interchangeably to distinguish one component from another and are not intended to signify location or importance of the individual components.

The term "adjacent" as used herein with reference to two walls and/or surfaces refers to the two walls and/or surfaces contacting one another, or the two walls and/or surfaces being separated only by one or more nonstructural layers and the two walls and/or surfaces and the one or more nonstructural layers being in a serial contact relationship (i.e., a first wall/surface contacting the one or more nonstructural layers, and the one or more nonstructural layers contacting the a second wall/surface).

As used herein, the terms "integral", "unitary", or "monolithic" as used to describe a structure refers to the structure being formed integrally of a continuous material or group of materials with no seams, connections joints, or the like. The integral, unitary structures described herein may be formed through additive manufacturing to have the described structure, or alternatively through a casting process, etc.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 1, 2, 4, 10, 15, or 20 percent margin. These approximating margins may apply to a single value, either or both endpoints defining numerical ranges, and/or the margin for ranges between endpoints.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

The present disclosure is generally directed to systems and methods for reducing a turbine or compressor clearance gap between a plurality of rotor blades of a turbine engine and a shroud or stator of the turbine engine. For example, in an embodiment, control logic can be activated (e.g., turned on) in combination with modulating fan pitch and controlling fan speed to minimize or otherwise reduce transient turbine or compressor clearance impact without sacrificing thrust response. This can be accomplished by controlling the rate of change of fan speed to minimize or otherwise reduce clearance reduction and by using fan pitch to control thrust given a fan speed. Further, in an embodiment, the fan pitch and the fan speed can be independently controlled to meet overall fan thrust requirements. In addition, during this transient, the fan pitch can be maintained below the aero-mechanic and/or operability limits.

Referring now to the drawings, wherein identical numerals indicate the same elements throughout the figures, FIG. 1 is a schematic cross-sectional view of a gas turbine engine 10 in accordance with an exemplary embodiment of the present disclosure. More particularly, for the embodiment of FIG. 1, the gas turbine engine 10 is a high-bypass turbofan jet engine, sometimes also referred to as a "turbofan engine." As shown in FIG. 1, the gas turbine engine 10 defines an axial direction A (extending parallel to a longitudinal centerline 12 provided for reference), a radial direction R, and a circumferential direction C extending about the longitudinal centerline 12. In general, the gas turbine engine 10 includes a fan section 14 and a turbomachine 16 disposed downstream from the fan section 14.

The turbomachine 16 depicted generally includes a tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft 34 (which may additionally or alternatively be a spool) drivingly connects the HP turbine 28 to the HP compressor 24. A low pressure (LP) shaft 36 (which may additionally or alternatively be a spool) drivingly connects the LP turbine 30 to the LP compressor 22. The compressor section, combustion section 26, turbine section, and jet exhaust nozzle section 32 together define a working gas flowpath 37.

For the embodiment depicted, the fan section 14 includes a fan 38 having a plurality of fan blades 40 coupled to a disk 42 in a spaced apart manner. As depicted, the fan blades 40 extend outwardly from disk 42 generally along the radial direction R. Each fan blade 40 is rotatable relative to the disk 42 about a pitch axis P by virtue of the fan blades 40 being operatively coupled to a pitch change mechanism 44 configured to collectively vary the pitch of the fan blades 40, e.g., in unison. The gas turbine engine 10 further may include a power gear box 46, and the fan blades 40, disk 42, and pitch change mechanism 44 are together rotatable about the longitudinal centerline 12 by LP shaft 36 across the power gear box 46. The power gear box 46 includes a plurality of gears for adjusting a rotational speed of the fan 38 relative to a rotational speed of the LP shaft 36, such that the fan 38 may rotate at a more efficient fan speed. Accordingly, the gas turbine engine 10 depicted is configured as a geared gas turbine engine (i.e., including the power gear box 46) and a variable pitch gas turbine engine (i.e., including the fan 38 configured as a variable pitch fan).

Referring still to the embodiment of FIG. 1, the disk 42 is covered by rotatable front hub 48 of the fan section 14 (sometimes also referred to as a "spinner"). The front hub 48 is aerodynamically contoured to promote an airflow through the plurality of fan blades 40. Additionally, the fan section 14 includes an annular fan casing or outer nacelle 50 that circumferentially surrounds the fan 38 and/or at least a portion of the turbomachine 16. It should be appreciated that the nacelle 50 is supported relative to the turbomachine 16 by a plurality of circumferentially spaced outlet guide vanes 52 in the embodiment depicted. Moreover, a downstream section 54 of the nacelle 50 extends over an outer portion of the turbomachine 16 so as to define a bypass airflow passage 56 therebetween.

During operation of the gas turbine engine 10, a volume of air 58 enters the gas turbine engine 10 through an associated inlet 60 of the nacelle 50 and fan section 14. As the volume of air 58 passes across the fan blades 40, a first portion of air 62 is directed or routed into the bypass airflow passage 56 and a second portion of air 64 as indicated by arrow 64 is directed or routed into the working gas flowpath 37, or more specifically into the LP compressor 22. The ratio between the first portion of air 62 and the second portion of air 64 is commonly known as a bypass ratio. A pressure of the second portion of air 64 is then increased as it is routed through the HP compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft 34, thus causing the HP shaft 34 to rotate, which supports operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft 36, thus causing the LP shaft 36 to rotate, which supports operation of the LP compressor 22 and/or rotation of the fan 38.

The combustion gases 66 are subsequently routed through the jet exhaust nozzle section 32 of the turbomachine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the gas turbine engine 10, also providing propulsive thrust. The HP turbine 28, the LP turbine 30, and the jet exhaust nozzle section 32 at least partially define a hot gas path 78 for routing the combustion gases 66 through the turbomachine 16.

It should be appreciated, however, that the gas turbine engine 10 depicted in FIG. 1 is by way of example only, and that in other exemplary embodiments, the gas turbine engine 10 may have any other suitable configuration. For example, although the gas turbine engine 10 depicted is configured as a ducted gas turbine engine (i.e., including the outer nacelle 50), in other embodiments, the gas turbine engine 10 may be an unducted gas turbine engine (such that the fan 38 is an unducted fan, and the outlet guide vanes 52 are cantilevered from the outer casing 18). It should also be appreciated that in still other embodiments, aspects of the present disclosure may be incorporated into any other suitable gas turbine engine. For example, in other embodiments, aspects of the present disclosure may (as appropriate) be incorporated into, e.g., a turboprop gas turbine engine, a turboshaft gas turbine engine, a turbojet gas turbine engine, or a hybrid electric engine. In additional embodiments, aspects of the present disclosure may be incorporated into engines burning hydrogen gas, sustainable aviation fuels, or powered by hydrogen fuel cells.

Figure 2:
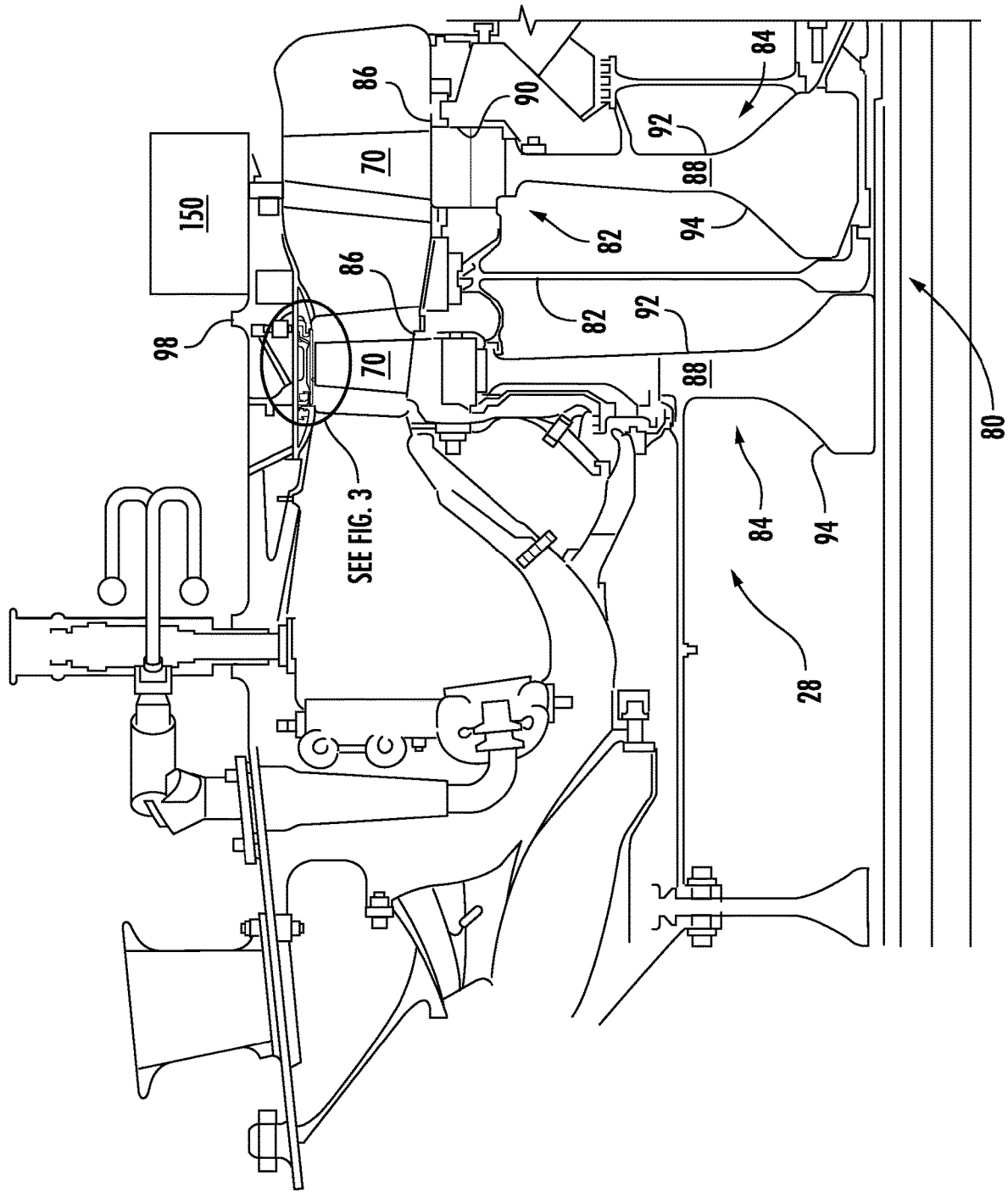
FIG. 2 is an enlarged cross-sectional schematic view of a portion of the gas turbine engine shown in FIG. 1 including a clearance control system.
Figure 3:
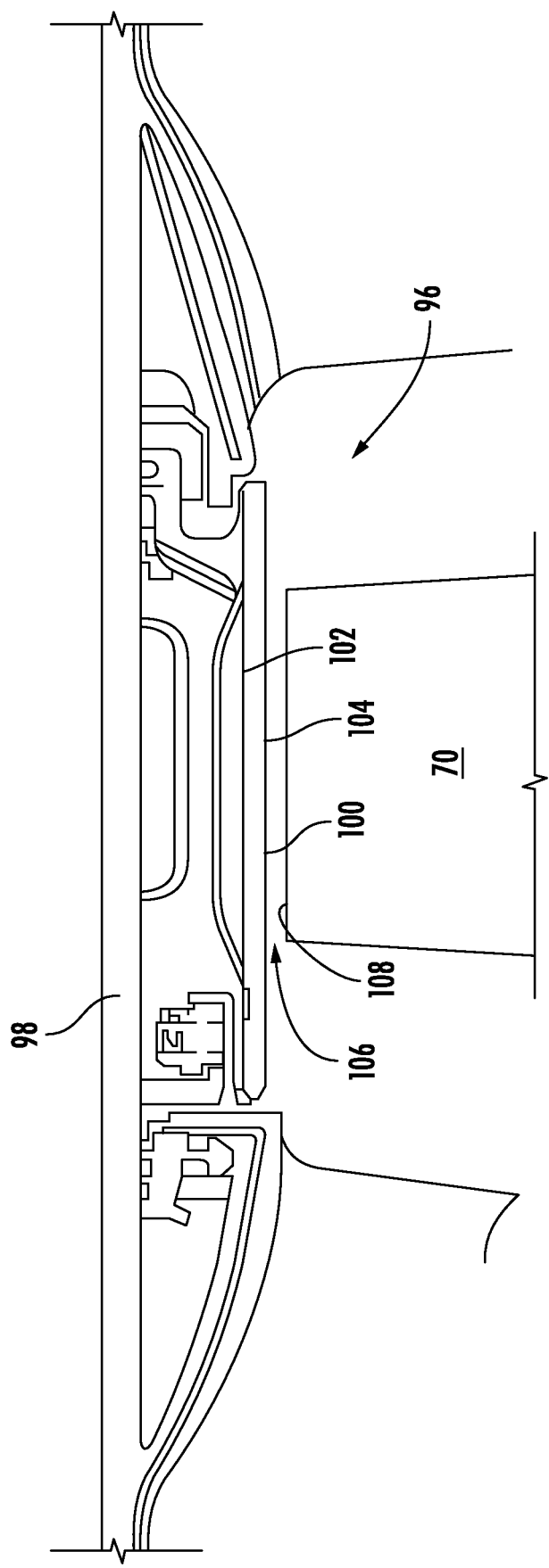
FIG. 3 is an enlarged cross-sectional schematic view of a portion of the gas turbine engine shown in FIG. 2.

Referring now to FIGS. 2 and 3, enlarged cross-sectional schematic views of portions of the gas turbine engine 10 including a clearance control system 150 are illustrated. In an embodiment, as shown in FIG. 2, the HP turbine 28 is coupled substantially coaxially with, and downstream from, the HP compressor 24 and the combustion section 26. The HP turbine 28 includes a rotor assembly 80 that includes at least one rotor 82 that is formed by one or more disks 84. In an embodiment, the disk 84 includes an outer rim 86, and an integral web 88 extending generally radially therebetween and radially inward from a respective blade dovetail slot 90. Each disk 84 also includes a plurality of the HP turbine rotor blades 70 extending radially outward from the outer rim 86. The disk 84 includes an aft surface 92 and an upstream surface 94.

As shown in FIG. 3, circumscribing the row of HP turbine rotor blades 70, and in close clearance relationship therewith, is an annular shroud assembly 96, also referred to as a static casing assembly. In an embodiment, the shroud assembly 96 is radially inward from a surrounding turbine casing 98 and includes a plurality of shroud members 100 (FIG. 3) or arcuate sectors. Further, as shown, adjacent shroud members 100 are coupled together such that the shroud members 100 circumscribe the HP turbine rotor blades 70.

Each shroud member 100 includes a radially outer surface 102 and an opposite radially inner surface 104. A clearance gap 106 is defined between the shroud inner surface 104 and blade tips 108 of the HP turbine rotor blades 70. More specifically, the clearance gap 106 is defined as the distance between the blade tips 108 and the shroud inner surface 104. It should be further understood that though the present disclosure is described with reference to the HP turbine 28, the gas turbine engine 10 may include a plurality of stages including a plurality of rotor blades and clearance gaps associated with each engine module and stage.

Accordingly, the clearance control system 150 facilitates controlling the clearance gap 106 during engine operation. Thus, referring now to FIG. 4, a schematic block diagram of an embodiment of the clearance control system 150 in accordance with the present disclosure is illustrated. In an embodiment, the clearance control system 150 includes a controller 152 such as, but not limited to, a FADEC. The controller 152 includes a processor 156 and a memory 158 communicatively coupled to the processor 156. The turbine engine 10 described herein is represented as engine 154 having a fan 160 and a core engine 162 in serial flow communication. In some embodiments, substantially all air flow through the fan 160 goes through core engine 162. In various embodiments, the engine 154 is a high bypass type engine and only a portion of the airflow entering fan 160 passes through core engine 162. Although described as a FADEC, in various embodiments, the controller 152 may include other forms of engine controller capable of operating as described herein.

A plurality of process sensors 164 are positioned about the engine 154 to sense process parameters associated with the engine 154. Such process parameters may include, for example, engine speed, fuel flow, damper and guide vane positions, stator vane clearance, as well as various temperatures of components in the engine 154. The process sensors 164 are communicatively coupled to the controller 152.

The clearance control system 150 may also be communicatively coupled to a flight control system 170 (e.g., flight management system or FMS), e.g., through a communications channel 172. Further, as shown, the flight control system 170 includes a processor 174 and a memory 176 communicatively coupled to processor 174. In an embodiment, the communications channel 172 is a wired connection between the controller 152 and flight control system 170. In other embodiments, the communications channel 172 may be a wireless communication medium. In an embodiment, the flight control system 170 is located proximate to a cockpit (not shown) of the aircraft and the controller 152 is located proximate the engine to which it is associated. The flight control system 170 may be embodied in a single processor-based component or the functions of the flight control system 170 may be carried out by a plurality of components configured to perform the functions described herein. Some of the components performing the functions of the flight control system 170 may be located proximate the cockpit and others may be distributed inside the aircraft for convenience, safety, and/or optimal operational considerations. Although the flight control system is described herein as a flight management system (FMS), it is to be understood that the systems and methods described herein include communication between an engine controller and any aircraft-mounted avionics function.

The flight control system 170 is configured to interface with various other systems both onboard the aircraft and offboard the aircraft. For example, the flight control system 170 may receive current aircraft status from a plurality of aircraft sensors 178 through a sensing system 180. Such aircraft sensors 178 may include pitot tubes for determining airspeed, gyros, compasses, accelerometers, position sensors, altimeters, and various other sensors that may be able to detect a condition, status, or position of the aircraft.

Figure 4:
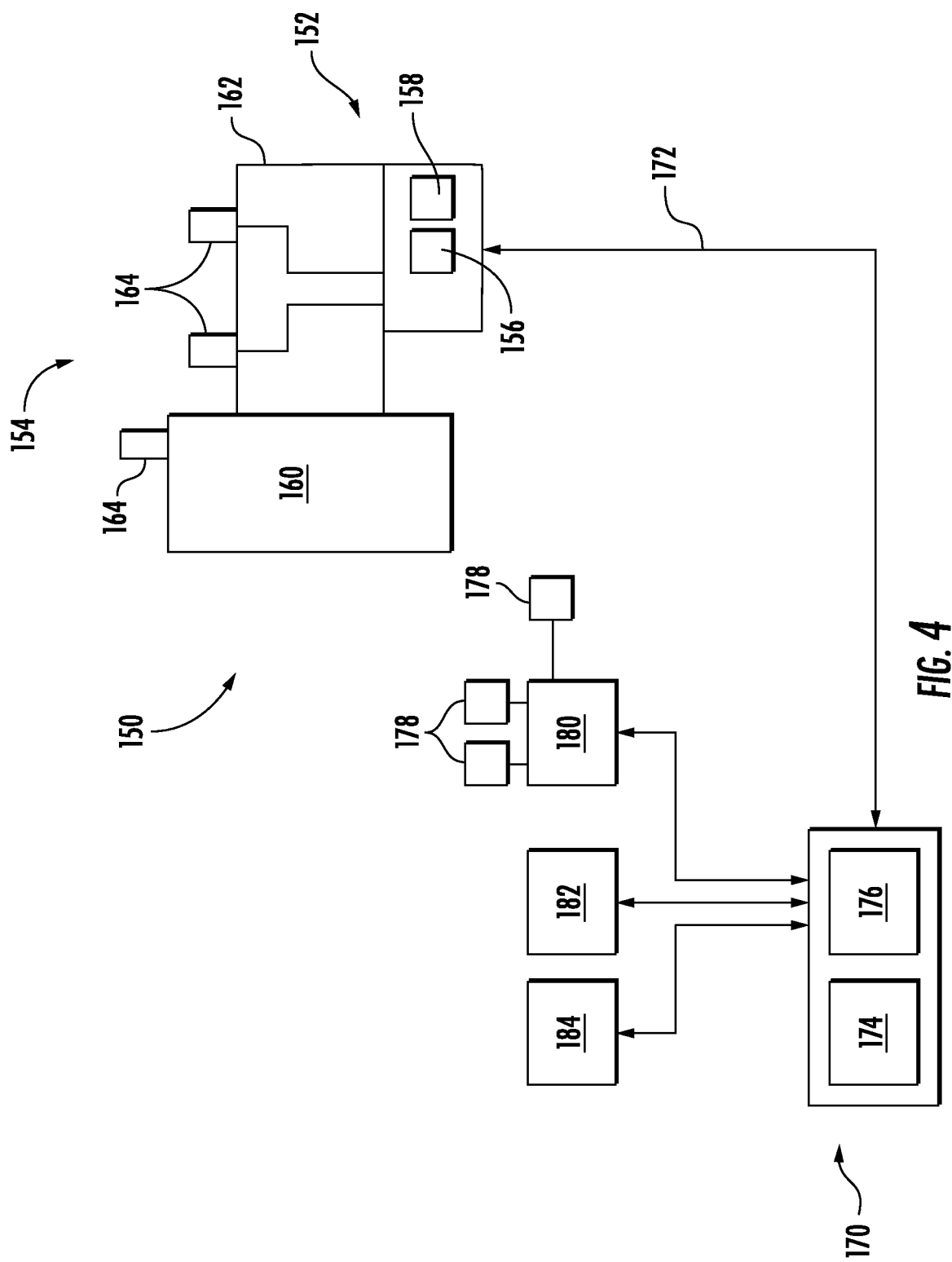
FIG. 4 is a schematic block diagram of a system for reducing a turbine or compressor clearance gap between a plurality of rotor blades of a turbine engine and a shroud of the turbine engine in accordance with an exemplary embodiment of the present disclosure.

Further, as shown in FIG. 4, the flight control system 170 may also receive information from one or more onboard processing systems 182, which may be standalone systems or systems having functions distributed across several computer systems. Moreover, the flight control system 170 and onboard processing systems 182 may communicate using a wired communications channel and/or network connection (e.g., Ethernet or an optical fiber), a wireless communication means (such as radio frequency (RF), e.g., FM radio and/or digital audio broadcasting, an Institute of Electrical and Electronics Engineers (IEEE®) 802.11 standard (e.g., 802.11 (g) or 802.11 (n)), the Worldwide Interoperability for Microwave Access (WIMAX®) standard, cellular phone technology (e.g., the Global Standard for Mobile communication (GSM)), a satellite communication link, etc.,) and/ or any other suitable communication means.

As used herein, a wired communications channel includes channels that use fiber and other optical means for communications. The flight control system 170 may also receive information from one or more offboard processing systems 184, which may be standalone systems or systems having functions distributed across several computer systems and/or several sites. The offboard processing systems 184 and the flight control system 170 are communicatively coupled using one or more wireless communications media including, but not limited to, radio frequency (RF), e.g., FM radio and/or digital audio broadcasting, an Institute of Electrical and Electronics Engineers (IEEE®) 802.11 standard (e.g., 802.11 (g) or 802.11 (n)), the Worldwide Interoperability for Microwave Access (WIMAX®) standard, cellular phone technology (e.g., the Global Standard for Mobile communication (GSM)), a satellite communication link, and/or any other suitable communication means.

As in at least some known aircraft operating procedures, a step climb maneuver occurs when the pilot of an aircraft elects to increase the altitude at which the aircraft is traveling. Altitude steps conventionally occur in 2,000 feet increments, as dictated by current FAA regulations. This means, for example, that the pilot of an aircraft flying at 33,000 feet may elect to undertake a step climb maneuver to cause the aircraft to climb 2,000 feet to an altitude of 35,000 feet. In order to effectuate the step climb maneuver, the pilot modifies the controls of an autopilot/auto-throttle system of the flight control system 170 to request that the aircraft ascend to the desired cruising altitude. The flight control system 170 then uses predetermined algorithms to increase engine power in order to cause the aircraft to climb. Because a request for increased engine power conventionally necessitates that the gas turbine engine 10 spin faster to increase engine thrust, the HP turbine rotor blades 70 grow due to mechanical forces and associated thermal changes. This turbine blade growth causes clearances within, for example, the HP turbine 28 to be reduced. If the growth exceeds design clearances, the HP turbine rotor blades 70 will rub against the turbine casing 98 of the gas turbine engine 10, potentially causing damage to engine components or reducing the engine's efficiency.

For example, a step climb from approximately 33,000 to 35,000 feet may take the aircraft more than two minutes to accomplish. Known flight control system step climb algorithms, however, command the gas turbine engine 10 response to a request for increased thrust within, for example, 5 seconds, causing the rate of growth of the HP turbine rotor blades 70 to exceed the rate of growth of the engine 10 casing. Because the HP turbine rotor blades 70 grow faster than the surrounding turbine casing 98, it is necessary for engine designers to factor in additional clearance to prevent a rub condition in these situations. In the above example, the additional clearance is referred to herein as step-climb headroom. However, by increasing the clearance between the end of the HP turbine rotor blades 70 and the turbine casing 98, more air is able to escape past the HP turbine rotor blades 70, instead of traveling through the HP turbine rotor blades 70, which results in decreased engine performance and increased fuel burn. Therefore, it is desirable to develop algorithms which take into account controlling (e.g., minimizing) the clearance gap 106 during the step climb transient event.

The function of the clearance control system 150 is to modulate active clearance control cooling flow, e.g., by increasing the cooling flow to shrink the turbine shrouds to reduce clearances in the cruise mode, and decreasing the cooling flow during the step climb to increase the clearances so that there is no rub as the fan speed reaches a high value. Because of the thermal time constant of the turbine shrouds, the clearance will not increase instantaneously but will gradually increase so that those are large enough as the fan speed accelerates to a high value preventing rubs.

Figure 5:
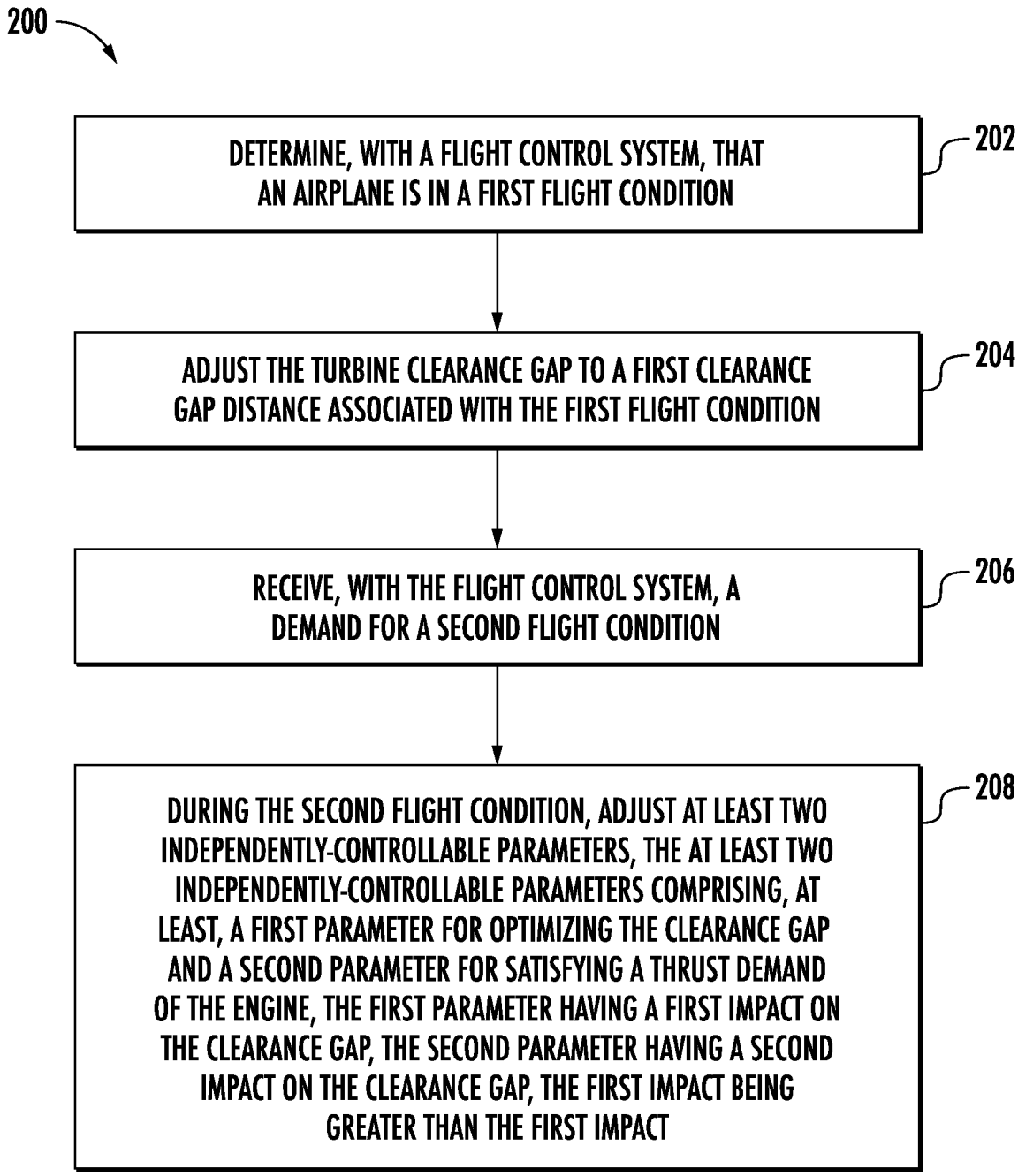
FIG. 5 is a flow diagram of a method for reducing a turbine clearance gap between a plurality of rotor blades of a turbine engine and a shroud of the turbine engine in accordance with an exemplary embodiment of the present disclosure.

Referring now to FIG. 5, a flow diagram of an embodiment of a method 200 of reducing a clearance gap between a plurality of rotor blades and a shroud of an engine, such as engine 10 (shown in FIG. 1) is illustrated. In general, the method 200 will be described herein with reference to the engine 10 described herein. However, it should be appreciated that the disclosed method 200 may be implemented with any engine having any other suitable configurations. In addition, although FIG. 5 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown at (202), the method 200 includes determining, with a flight control system (such as flight control system 170), that an airplane is in a first flight condition. For example, in an embodiment, the first flight condition may correspond to a steady-state cruise condition, e.g., in which the cooling flow increases to shrink the shroud assembly 96 to effect tight clearances for increased engine performance. More specifically, in an embodiment, to determine whether the aircraft is in a cruise condition, the engine control system 152 may examine the following parameters: that the cruising altitude of the aircraft is greater than 29,000 feet; that the cruising altitude has not changed significantly over a predetermined period of time; that a speed of the aircraft is relatively constant; and that the throttle position of the aircraft is not changing. As shown at (204), the method 200 includes adjusting the clearance gap, such as clearance gap 106, to a first clearance gap distance associated with the first flight condition. For example, in an embodiment, the clearance gap is adjusted (e.g., decreased) when the speed of the aircraft is increased.

As shown at (206), the method 200 includes receiving, with the flight control system, a demand for a second flight condition. For example, in an embodiment, the second flight condition may correspond to an increased power transient, such as a step climb power transient, due to the aircraft operator instituting a step climb to a higher altitude. In certain embodiments, the demand may be received by monitoring the position of the throttle and observing a particular change in the angle of the throttle, signifying a step climb event. In another embodiment, the request may also be received by the autopilot/auto-throttle control system of the flight control system 170, such that the pilot requests an increase from one particular altitude to a second particular altitude. In response to that request, the flight control system 170 sends a signal to the engine control system 152 requesting increased engine power.

Still referring to FIG. 5, as shown at (208), the method 200 includes during the second flight condition, adjusting at least two independently-controllable parameters, the at least two independently-controllable parameters comprising, at least, a first parameter for optimizing the clearance gap and a second parameter for satisfying a thrust demand of the engine, the first parameter having a first impact on the clearance gap, the second parameter having a second impact on the clearance gap, the first impact being greater than the second impact. For example, in an embodiment, independently controllable parameters may include a power parameter of the engine (i.e., having a high impact on the clearance gap) and a pitch parameter of the engine (i.e., having a lower impact on the clearance gap) (as further illustrated and explained with respect to FIGS. 6A-6D). More specifically, in an embodiment, the power parameter may include fan speed, engine pressure ratio, or cooling flow. Moreover, in an embodiment, the pitch parameter may include a fan pitch. Thus, in an embodiment, the method 200 may include independently controlling the power parameter and the pitch parameter, which may include, e.g., simultaneously decreasing the cooling flow so as to expand the shroud to increase clearances toward preventing rubs as the fan speed reaches a high speed.

Thus, in certain embodiments, when the engine 10 is operating with tight operating clearances, modulating the fan pitch, and controlling the fan speed minimizes or otherwise reduces the transient turbine clearance impact without sacrificing the thrust response. In other words, fan speed is configured to minimize clearance reduction, whereas pitch adjustment is configured to control thrust at a given fan speed. This requires fan pitch and fan speed to be independently controlled to meet overall fan thrust. In further embodiments, the fan pitch can also be maintained below the aeromechanic and/or operability limits during this transient. In additional embodiments, still other combinations in thrust control can be used if more than one controlling handle is used and the clearances closure can be reduced without sacrificing thrust response. Accordingly, methods of the present disclosure provide a net thrust response to the second flight condition that is essentially zero or negligible to the pilot. Further embodiments of the present disclosure may also benefit the compressor operating clearances as the overall rotor growth due to changes in speed may be balanced with the thermal growth of the rotor and stator components allowing for the assembly and operating clearances to be tighter than a conventional aircraft engine.

The method 200 of the present disclosure can be better understood with respect to FIGS. 6A-6D. In particular, FIG. 6A is a chart 250 illustrating thrust as a function of time. In the illustrated embodiment, from time $T_1$ to time $T_2$, the engine is operating in a cruise condition 252. At time $T_2$, the engine 10 receives a demand for a second flight condition, such as a demand for a step climb to a higher altitude. Due to the corresponding fan speed (FIG. 6B) and fan pitch (FIG. 6D) control, the thrust response is a near-normal thrust response, as shown via near corresponding lines 254 (normal thrust response) and 256 (thrust response during second flight condition).

FIG. 6B is a chart 300 illustrating a two-step engine response schedule as a function of fan speed. In the illustrated embodiment, the dashed line 320 represents a simplified example of engine response to a commanded change 310 in the absence of the clearance control system 150. Without the proposed two-step engine response schedule, after a request for an increase in fan speed from a steady-state cruise speed (represented as "0%" on the y-axis of chart 300) to a climb speed (e.g., about a 12% increase), the engine 10 responds quickly and increases rotational speed of the low speed rotor shaft to the climb speed.

The solid line represents a two-step response schedule implemented using the clearance control system 150 in accordance with the present disclosure. In the illustrated embodiment of FIG. 6B, the clearance control system 150 implements different engine responsiveness levels as a function of N1 rate of increase from a steady-state cruise fan speed. In particular, the clearance control system 150 implements a first, "normal" level of engine responsiveness 330 ("fast response" 330) for small changes in fan speed, as represented by the greater slope during the period of fast response 330. Further, as shown, the clearance control system 150 implements a second, reduced level of engine responsiveness 340 ("slower response" 340) for larger changes in fan speed, as represented by the reduced slope during the period of slower response 340. In the illustrated embodiment, the clearance control system 150 implements the fast response 330 for changes in fan speed between 0% and about 4% and implements the slower response 340 for changes in fan speed above 4%. Put another way, the clearance control system 150 implements the fast response 330 for changes in fan speed over a first change in power level or small increases in throttle and implements the slower response 340 for changes in fan speed over a second change in power level or larger increases in throttle.

The fast response 330 defines a rate of increase limit on N1. In the illustrated embodiment, the fast response 330 limit on the rate of increase of N1 is approximately 1.5%/sec. Accordingly, the engine 10 responds to requests for relatively small increases in throttle with the fast response 330 for a period up to about 2-3 sec. For rates of increase of N1 beyond 4%, the slower response 340 defines a rate of increase limit for N1 of approximately 0.25%/sec, for example, up to a fan speed increase of 12%. In other words, once N1 has increased 4% from its steady-state cruise speed, the clearance control system 150 implements the slower response 340 (slows engine responsiveness) to increase N1 to the requested speed. Alternatively, for N1 rate increases that remain below 4%, the clearance control system 150 only implements the fast response 330.

This two-step response schedule facilitates maintaining a fast engine response for relatively small changes in throttle during routine maneuvers, for example, for maintaining altitude and/or Mach number in response to environmental changes (e.g., wind gusts). Moreover, the two-step response schedule of reduced engine responsiveness facilitates reducing the clearance gap 106 described herein, as well as clearances between turbine blades of the LP turbine 30 and a casing therearound and other stages of the engine.

Referring now to FIG. 6D, a chart 500 illustrating a two-step engine response schedule as a function of fan pitch is illustrated. In particular, as shown, the fan pitch can also be adjusted during the second flight condition to achieve the commanded thrust. For example, as shown, the fan pitch is maintained during steady-state cruise conditions. Further, as shown, a commanded change in the flight condition is represented by line 510. Thus, upon receiving the demand for the second flight condition, the clearance control system 150 implements a normal pitch response is illustrated for the first third or so of the second flight condition, which achieves disturbance rejection during level flight. Then, as shown at 506, the fan pitch can be increased more sharply up to operability/aeromechanic limits 508. Once such limits 508 are reached, as shown at 512, a slow change in the fan pitch approaching the climb command with the fan speed response maintaining the overall thrust constant is implemented by the clearance control system 150. Further, in such embodiments, tight operating clearance can be maintained during this time.

Referring particularly to FIG. 6C, a chart 400 illustrating a turbine clearances as a function of time is illustrated. In particular, as shown, the change in the clearance gap with and without the clearance control system 150 being activated is represented by lines 402, 404. Thus, as shown, the clearance control system 150 is configured to minimize the clearance gaps during step climb transients, as represented by change 406. Further, as shown, normal turbine clearances are represented by line 408, whereas reduced turbine clearances are represented by line 410. In other words, by using the fan pitch to achieve the commanded thrust and moving the fan speed independent of the fan pitch, the clearance control system 150 is configured to minimize the impact to the turbine clearances.

Figure 7:
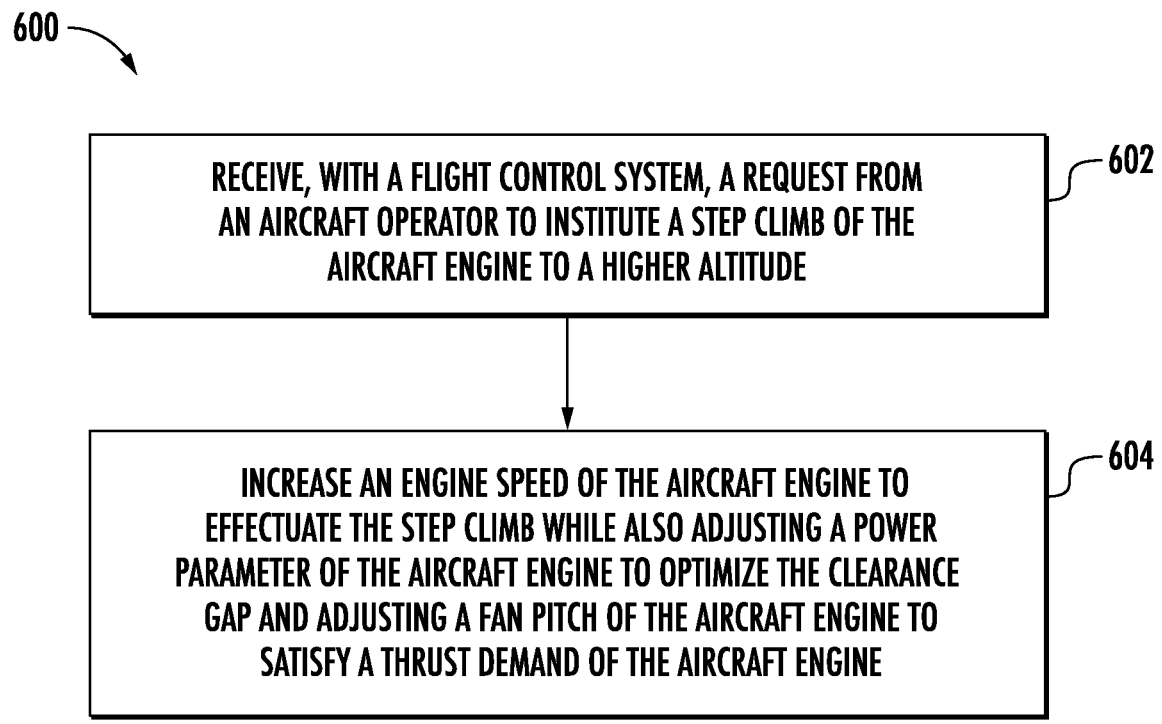
FIG. 7 is a flow diagram of an embodiment of a method for controlling a clearance gap between a plurality of rotor blades and a shroud of an aircraft engine according to embodiment of the present disclosure.

Referring now to FIG. 7, a flow diagram of an embodiment of a method 600 for controlling a clearance gap between a plurality of rotor blades and a shroud of an aircraft engine, such as engine 10 (shown in FIG. 1), is illustrated. In general, the method 600 will be described herein with reference to the engine 10 described herein. However, it should be appreciated that the disclosed method 600 may be implemented with any engine having any other suitable configurations. In addition, although FIG. 7 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown at (602), the method 600 includes receiving, with a flight control system, a request from an aircraft operator to institute a step climb of the aircraft engine to a higher altitude. As shown at (604), the method 600 includes increasing an engine speed of the aircraft engine to effectuate the step climb while also adjusting a power parameter of the aircraft engine to optimize the clearance gap and adjusting a fan pitch of the aircraft engine to satisfy a thrust demand of the aircraft engine. For example, in an embodiment, the method 600 may include increasing the engine speed of the aircraft engine to effectuate the step climb while also adjusting a power parameter, such as opening the pitch of the aircraft engine to satisfy the thrust demand of the step climb. Furthermore, in an embodiment, at the initiation of the step climb, the method 600 may include reducing the cooling flow to initiate expansion of the shroud assembly 96 to effectuate an increase in turbine engine clearance to prevent rubs as the fan speed accelerates to the final high value. In such embodiments, during the step climb transient, which is of a short duration, the impact of the large transient clearances on fuel burn is minimal.

The systems, methods, and apparatus described herein have at least a technical effect of more efficient operation of an aircraft by reducing the turbine clearance gap by a preselected amount when the aircraft is determined to have entered a stable flight phase and is expected to remain in the stable flight phase for a preselected time period. Reducing the turbine or compressor clearance gap facilitates improving fuel efficiency, thrust, and turbine life, each of which facilitates saving money on fuel and/or service.

Exemplary embodiments of systems, methods, and apparatus for controlling a turbine clearance gap in an aircraft engine are described above in detail. The systems, methods, and apparatus are not limited to the specific embodiments described herein but, rather, steps of the methods and/or components of the system and/or apparatus may be utilized independently and separately from other steps and/or components described herein. Further, the described steps and/or components may also be defined in, or used in combination with, other systems, methods, and/or apparatus, and are not limited to practice with only the systems, methods, and apparatus as described herein. Other embodiments may include actuation of existing engine variable geometry, which may include variable stator vanes, variable stator inlet guide vanes, variable bleed valves, customer, or domestic bleed valves, modulating turbine cooling systems, and/or third stream modulated doors.

Further aspects are provided by the subject matter of the following clauses:

A method for reducing a clearance gap between a plurality of rotor blades and a shroud assembly of an engine, the method comprising: determining, with a flight control system, that an airplane is in a first flight condition; adjusting the clearance gap to a first clearance gap distance associated with the first flight condition; receiving, with the flight control system, a demand for a second flight condition; and during the second flight condition, adjusting at least two independently controllable parameters, the at least two independently controllable parameters comprising, at least, a first parameter for optimizing the clearance gap and a second parameter for satisfying a thrust demand of the engine, the first parameter having a first impact on the clearance gap, the second parameter having a second impact on the clearance gap, the first impact being greater than the second impact.

The method of any preceding clause, wherein the at least two independently controllable parameters comprise a power parameter of the engine and a pitch parameter of the engine.

The method of any preceding clause, wherein the power parameter comprises at least one of fan speed, engine pressure ratio, or cooling flow and the pitch parameter comprises a fan pitch.

The method of any preceding clause, further comprising maintaining the fan pitch below aeromechanic and operability limits.

The method of any preceding clause, wherein the first flight condition is a steady-state cruise condition.

The method of any preceding clause, wherein the second flight condition is an increased power transient.

The method of any preceding clause, wherein a net thrust response to the second flight condition is negligible.

The method of any preceding clause, wherein the engine comprises at least one of a hybrid electric engine, an electric engine, or a fuel-burning engine.

A system for reducing a clearance gap between a plurality of rotor blades and a shroud assembly of an engine, the system comprising: a flight control system comprising a memory and one or more processors configured to perform a plurality of operations, the plurality of operations comprising: determining that an airplane is in a first flight condition; adjusting the clearance gap to a first clearance gap distance associated with the first flight condition; receiving a demand for a second flight condition; and during the second flight condition, adjusting at least two independently controllable parameters, the at least two independently controllable parameters comprising, at least, a first parameter for optimizing the clearance gap and a second parameter for satisfying a thrust demand of the engine, the first parameter having a first impact on the clearance gap, the second parameter having a second impact on the clearance gap, the first impact being greater than the second impact.

The system of any preceding clause, wherein the at least two independently controllable parameters comprise a power parameter of the engine and a pitch parameter of the engine.

The system of any preceding clause, wherein the power parameter comprises at least one of fan speed, engine pressure ratio, or cooling flow and the pitch parameter comprises a fan pitch.

The system of any preceding clause, wherein the plurality of operations further comprise maintaining the fan pitch below aeromechanic and operability limits.

The system of any preceding clause, wherein the first flight condition is a steady-state cruise condition.

The system of any preceding clause, wherein the second flight condition is an increased power transient.

The system of any preceding clause, wherein the engine comprises at least one of a hybrid electric engine, an electric engine, or a fuel-burning engine.

A method for controlling a clearance gap between a plurality of rotor blades and a shroud assembly of an aircraft engine, the method comprising: receiving, with a flight control system, a request from an aircraft operator to institute a step climb of the aircraft engine to a higher altitude; and increasing an engine speed of the aircraft engine to effectuate the step climb while also adjusting a power parameter of the aircraft engine to optimize the clearance gap and adjusting a fan pitch of the aircraft engine to satisfy a thrust demand of the aircraft engine.

The method of any preceding clause, wherein the power parameter comprises at least one of fan speed, engine pressure ratio, or cooling flow.

The method of any preceding clause, further comprising independently controlling the power parameter and the fan pitch.

The method of any preceding clause, further comprising maintaining the fan pitch below aeromechanic and operability limits.

The method of any preceding clause, wherein the aircraft engine comprises at least one of a hybrid electric engine, an electric engine, or a fuel-burning engine.

This written description uses exemplary embodiments to describe the presently disclosed subject matter, including the best mode, and also to enable any person skilled in the art to practice such subject matter, including making and using any devices or systems and performing any incorporated methods. The patentable scope of the presently disclosed subject matter is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

We claim:

1. A method for reducing a clearance gap between a plurality of rotor blades and a shroud assembly of an engine, the method comprising:
    determining, with a flight control system, that an airplane is in a first flight condition;
    adjusting the clearance gap to a first clearance gap distance associated with the first flight condition;
    receiving, with the flight control system, a demand for a second flight condition; and
    during the second flight condition, adjusting at least two independently controllable parameters, the at least two independently controllable parameters comprising, at least, a first parameter for optimizing the clearance gap and a second parameter for satisfying a thrust demand of the engine, the first parameter having a first impact on the clearance gap, the second parameter having a second impact on the clearance gap, the first impact being greater than the second impact, wherein a net thrust response to the second flight condition is essentially zero.

2. The method of claim 1, wherein the at least two independently controllable parameters comprise a power parameter of the engine and a pitch parameter of the engine.

3. The method of claim 2, wherein the power parameter comprises at least one of fan speed, engine pressure ratio, or cooling flow and the pitch parameter comprises a fan pitch.

4. The method of claim 3, further comprising maintaining the fan pitch below aeromechanic and operability limits.

5. The method of claim 1, wherein the first flight condition is a steady-state cruise condition.

6. The method of claim 1, wherein the second flight condition is an increased power transient.

7. The method of claim 1, wherein the engine comprises at least one of a hybrid electric engine, an electric engine, or a fuel-burning engine.

8. A system for reducing a clearance gap between a plurality of rotor blades and a shroud assembly of an engine, the system comprising:
    a flight control system comprising a memory and one or more processors configured to perform a plurality of operations, the plurality of operations comprising:
        determining that an airplane is in a first flight condition;
        adjusting the clearance gap to a first clearance gap distance associated with the first flight condition;
        receiving a demand for a second flight condition; and
        during the second flight condition, adjusting at least two independently controllable parameters, the at least two independently controllable parameters comprising, at least, a first parameter for optimizing the clearance gap and a second parameter for satisfying a thrust demand of the engine, the first parameter having a first impact on the clearance gap, the second parameter having a second impact on the clearance gap, the first impact being greater than the second impact, wherein a net thrust response to the second flight condition is essentially zero.

9. The system of claim 8, wherein the at least two independently controllable parameters comprise a power parameter of the engine and a pitch parameter of the engine.

10. The system of claim 9, wherein the power parameter comprises at least one of fan speed, engine pressure ratio, or cooling flow and the pitch parameter comprises a fan pitch.

11. The system of claim 10, wherein the plurality of operations further comprise maintaining the fan pitch below aeromechanic and operability limits.

12. The system of claim 8, wherein the first flight condition is a steady-state cruise condition.

13. The system of claim 8, wherein the second flight condition is an increased power transient.

14. The system of claim 8, wherein the engine comprises at least one of a hybrid electric engine, an electric engine, or a fuel-burning engine.

15. A method for controlling a clearance gap between a plurality of rotor blades and a shroud assembly of an aircraft engine, the method comprising:
    receiving, with a flight control system, a request from an aircraft operator to institute a step climb of the aircraft engine to a higher altitude; and
    increasing an engine speed of the aircraft engine to effectuate the step climb while also adjusting a power parameter of the aircraft engine to optimize the clearance gap and adjusting a fan pitch of the aircraft engine to satisfy a thrust demand of the aircraft engine, wherein adjusting the fan pitch includes implementing a first pitch response for a first portion of the step climb and subsequently implementing a second pitch response for a second portion of the step climb in which the fan pitch is increased up to aeromechanical and operability limits.

16. The method of claim 15, wherein the power parameter comprises at least one of fan speed, engine pressure ratio, or cooling flow.

17. The method of claim 15, further comprising independently controlling the power parameter and the fan pitch.

18. The method of claim 15, further comprising maintaining the fan pitch below the aeromechanic and operability limits.

19. The method of claim 15, wherein the aircraft engine comprises at least one of a hybrid electric engine, an electric engine, or a fuel-burning engine.

* * * * *